(12) United States Patent
Buard

(10) Patent No.: US 6,174,079 B1
(45) Date of Patent: Jan. 16, 2001

(54) LIGHTING MODULE WITH A LIGHT GUIDE FOR A MOTOR VEHICLE

(75) Inventor: Philippe Buard, Saint-Mande (FR)

(73) Assignee: Valeo Vision, Bobigny Cedex (FR)

( * ) Notice: Under 35 U.S.C. 154(b), the term of this patent shall be extended for 0 days.

(21) Appl. No.: 09/120,169

(22) Filed: Jul. 21, 1998

(30) Foreign Application Priority Data

Jul. 21, 1997 (FR) .................................................. 97 09210

(51) Int. Cl.⁷ ...................................................... F21V 9/00
(52) U.S. Cl. ........................ 362/511; 362/516; 362/517; 362/518; 362/521; 362/522; 362/297; 362/346
(58) Field of Search .................................. 362/511, 516, 362/518, 521, 517, 522, 346, 297

(56) References Cited

U.S. PATENT DOCUMENTS

| 4,432,039 | 2/1984 | Cibie | 362/31 |
| 5,739,931 | * 4/1998 | Zimmerman | 359/40 |

FOREIGN PATENT DOCUMENTS

| 19613211A1 | * 11/1996 | (DE) | F21M/3/02 |
| 19803987A1 | * 8/1998 | (DE) | F21M/3/12 |
| 2 514 105 | 4/1983 | (FR) | |
| 2 274 158 | 7/1994 | (GB) | |

OTHER PUBLICATIONS

French Search Report dated Apr. 14, 1998.

* cited by examiner

Primary Examiner—Cassandra Spyrou
Assistant Examiner—Leo Boutsikaris
(74) Attorney, Agent, or Firm—Morgan & Finnegan, L.L.P.

(57) ABSTRACT

A lighting module for a motor vehicle headlight, in which light from a light source is received by the input end of a light guide having a plurality of oblique facets, which are reflective by total reflection and cooperating with lenses.

The light guide comprises a set of transparent strips stacked together, and the module includes a reference member comprising a first portion which defines a horizontal reference plane, and a second portion which defines a vertical reference plane. The stacked transparent strips are abutted against these two portions of the reference member in a predetermined position on the longitudinal axis of the light guide, so that their facets will cooperate with the lenses to project in the emission direction images corresponding to the facets.

38 Claims, 2 Drawing Sheets

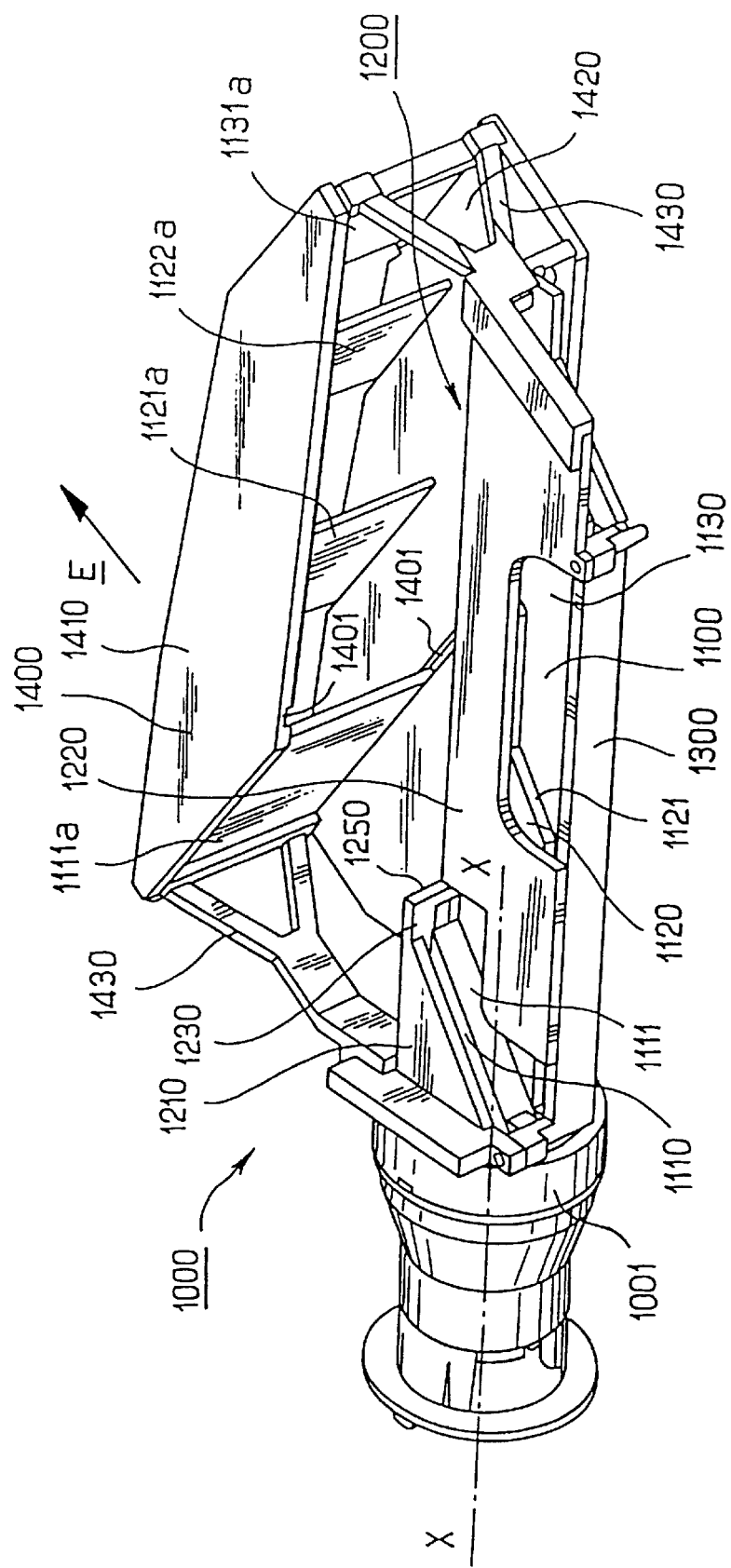
FIG_1

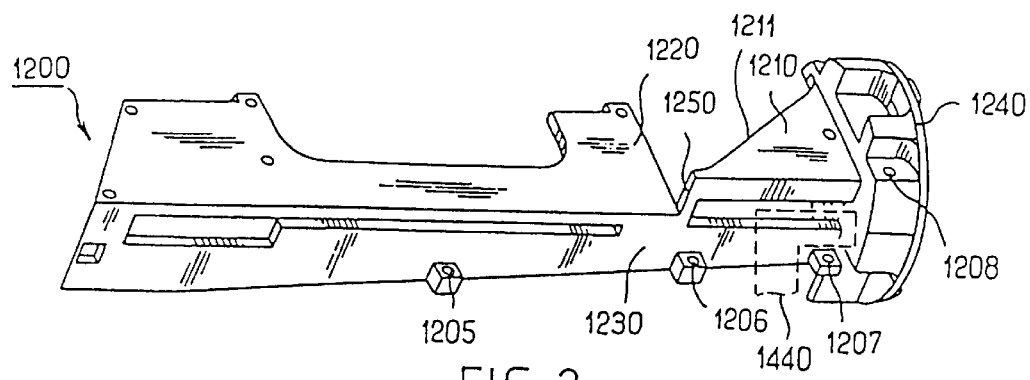
FIG_2
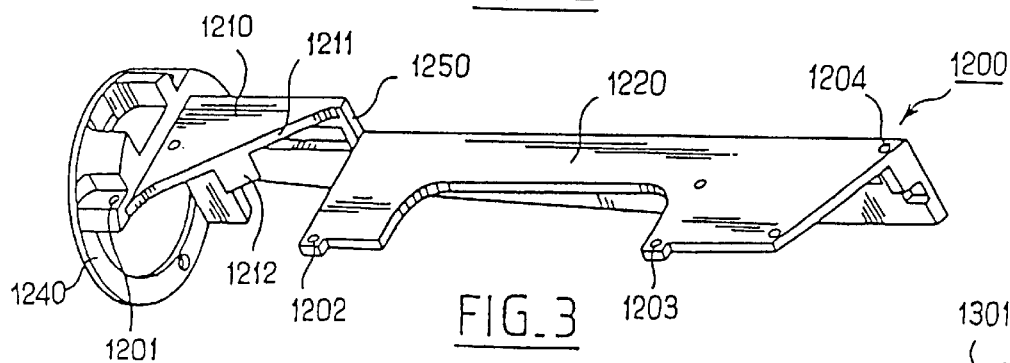
FIG_3
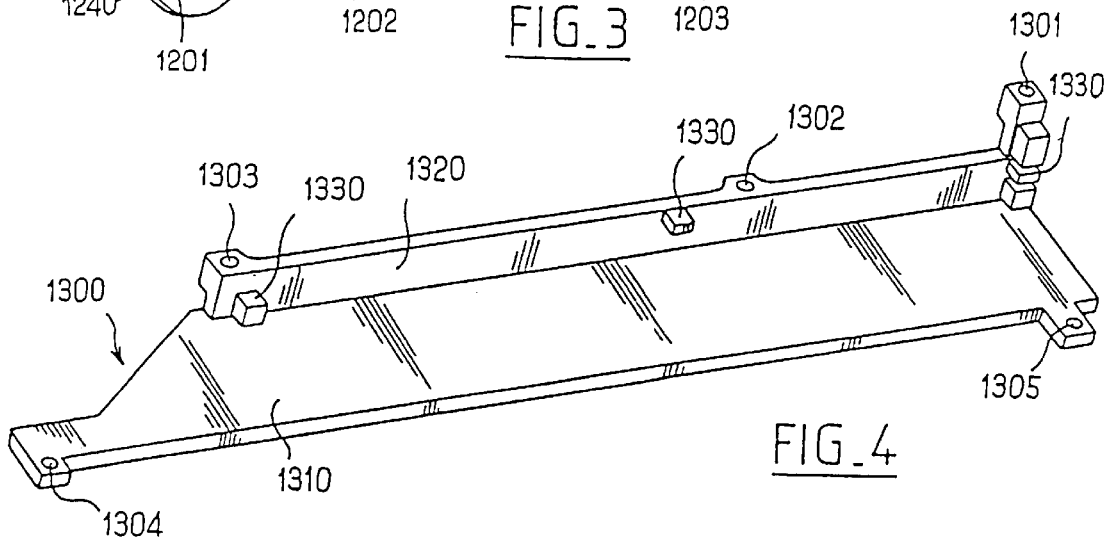
FIG_4
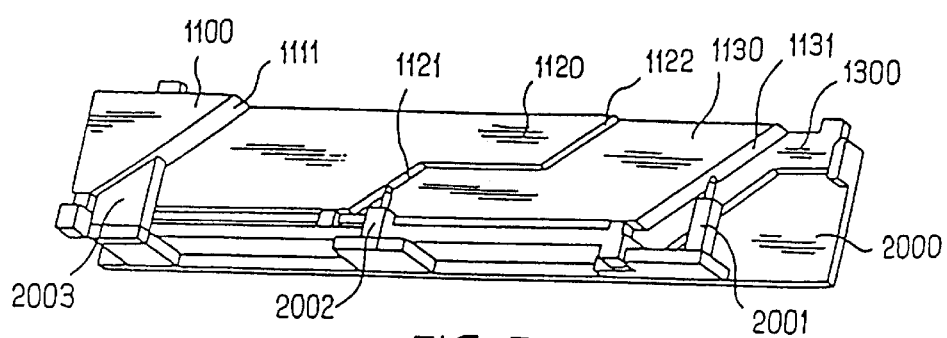
FIG_5

LIGHTING MODULE WITH A LIGHT GUIDE FOR A MOTOR VEHICLE

FIELD OF THE INVENTION

The present invention relates to headlights for motor vehicles.

BACKGROUND OF THE INVENTION

It is known, from French patent specification FR 2 514 105 of the Company Valeo Vision, to provide a headlight which a light guide consists of a single transparent barrel arranged horizontally and transversely to the direction of emission, with the front of the barrel having a vertical outlet face for emitting light, and the rear of the barrel including a set of cut-outs of limited height defining a series of oblique reflective facets. These facets are disposed in an optical cooperating relationship with lenses having an axis parallel to the emission direction, so that the lenses project images corresponding to the facets in that direction.

Such a headlight, however, have the disadvantage that it is not possible to control the quantity of light flux arriving at each of the facets of the single optical barrel, because of the multiple reflections of the light rays within the latter. In this regard, because of the uncontrollable multiple reflections of the light rays within the barrel, it can happen that one or more facets of the barrel are very weakly illuminated. A consequence of this is that the quality of the final light beam is altered.

In addition, in such a headlight, no mounting means is provided for ensuring accurate positioning of the oblique reflective facets and of the output face of the light guide with respect to the lenses, such that the latter will project, in the emission direction, images corresponding to the facets at a predetermined position, despite the dispersions of light within the thickness of the transparent barrel. In addition, no means is provided for ensuring accurate positioning of the input face of the light guide with respect to the light source itself.

DISCUSSION OF THE INVENTION

In order to overcome the above mentioned drawbacks, the present invention is directed to a lighting module in which conduction of the light flux between the real light source and each facet of the light guide is individualized, in such a way that the illumination of the facets can be controlled, and the desired final light beam obtained; and in which a system is provided for mounting the light guide in such a way as to ensure accurate positioning of the facets and output face of these elements in relation to the dioptric elements, so that the latter will project, in the emission direction, images corresponding to the well-positioned facets in the light beam, as well as good positioning of the input face of the light guide with respect to the light source.

According to one aspect of the invention, a lighting module for a motor vehicle, comprising a real light source, means for concentrating the light radiation from the source on the end of a light guide having a plurality of oblique reflective facets cooperating with a plurality of homologous dioptric elements which are on an axis parallel to the direction of emission of light, is characterised in that the light guide comprises a plurality of transparent strips, juxtaposed in a stack and extending along the longitudinal axis of the light guide, each transparent strip being formed, at least at its end furthest from the real light source, with an oblique reflective facet, and in that the lighting module further includes a reference member for mounting the light guide therein, the reference member comprising a horizontal, generally flat, first portion defining a horizontal reference plane, together with a vertical, generally flat, second portion extending along the longitudinal axis of the light guide and defining a vertical reference plane, the stack of juxtaposed transparent strips of the light guide being mounted in abutment against the first and second portions of the reference member, in a predetermined position along the longitudinal axis of the light guide, so that their reflective flat facets cooperate optically with the dioptric elements, whereby the images of the facets projected by the latter in the emission direction are positioned in a predetermined way.

Thus, the invention has the advantage that the transparent strips constituting the light guide are in engagement in two horizontal and vertical reference planes defined by the flat first and second portions of the reference member. This avoids the optical problems associated with manufacturing tolerances in the transparent strips, because the reflective facets of the strips are positioned in a predetermined way with reference to the horizontal reference plane, and their output faces are likewise positioned in a predetermined way with reference to the vertical plane.

According to a preferred feature of the invention, the horizontal first portion of the reference member is an upper portion against which at least part of the upper surface of the light guide bears, and the vertical second portion of the reference member is a cut-out front portion against which the output faces, for emission of light, of the transparent strips of the light guide, being front faces of the strips, bear.

According to another preferred feature of the invention, the module further includes a retaining member fixed on the said reference member and in engagement against the rear and lower faces of the light guide, so as to maintain the transparent strips by compression in engagement against the first and second portions of the reference member. In this embodiment, the module preferably also includes compressible flexible elements interposed operatively between the rear face of the light guide and the retaining member. Thus, in a module according to the invention in this preferred form, the transparent strips are held in compression in two directions transverse to the longitudinal axis of the light guide, namely the vertical direction and the horizontal direction. There is no additional retaining component in the direction of the longitudinal axis of the light guide, because the compressive forces and friction forces between the faces of the various transparent strips of the light guide are enough to maintain these strips immobile in that direction.

Preferably, the module includes an elastic pressure element between the light guide and the first portion of the reference member.

According to a further preferred feature of the invention, the reference member includes at one end a frame for mounting therein an elliptical reflector carrying the real light source, so that the second focus of the said elliptical reflector is situated at the end of the uppermost, and shortest, transparent strip of the light guide, which is in direct engagement against the said first portion of the reference member.

According to yet another preferred feature of the invention, the horizontal first portion of the reference member comprises a flat upper part and a flat lower part, the said upper and lower parts being in horizontal planes parallel to each other and joined together through a step, the horizontal upper part having an oblique terminal edge, and the first portion having a locating element for positioning, with respect to the longitudinal axis of the light guide, the transparent strip that is directly in engagement against the upper part of the reference member.

Preferably according to the invention, masks are provided for producing a cut-off beam, the masks being disposed in the path of some elementary beams from at least some of the reflective facets, between the front face of the appropriate transparent strips and the associated dioptric elements, the masks being fixed to a mounting member at the front of the module, the mounting member being fixed on the reference member in a predetermined position with respect to the reference member, the mounting member including means for mounting the dioptric elements in the mounting member.

Thus the invention affords the advantage, due to the mounting member at the front or output side of the module, that accurate positioning of the dioptric elements (for example Fresnel lenses) and masks can be ensured with respect to the front or output faces of the transparent strips. In addition, because the masks and the dioptric elements are fixed to the same mounting member, they keep their relative position in spite of displacements which may be induced by any possible dispersion or spreading effects. In this connection, in that case it is the assembly consisting of the masks and the dioptric elements fixed to each other that is displaced. The relative position of the images of the masks therefore does not vary, and the cut-off of the beam remains the same.

Preferably with this arrangement, the masks and mounting member are combined in a single component. Alternatively, the masks are separate components, applied on the mounting member and fixed on the latter by fastening means.

According to a still further feature of the invention, the transparent strips are made of glass. The reference member, the retaining member and the mounting member are preferably made in the form of aluminium castings. Preferably, the dioptric elements are Fresnel lenses made of poly-N-methylmethacrylimide.

According to the invention in a second aspect, a motor vehicle headlight includes a module according to the invention in its first aspect.

Preferably, the lighting module is fixed to a long range beam reflector, the lighting module providing the short range function.

According to the invention in a third aspect, a method of making a light module incorporating features of the invention is characterised in that:

(a) the retaining member is positioned on a mounting plate carrying locating elements placed in predetermined positions on the longitudinal axis of the mounting plate, for positioning at least some of the transparent strips on the longitudinal axis of the light guide;

(b) the transparent strips of the light guide are placed on the retaining member, one on top of another, in decreasing lengths, with at least some of the transparent strips being positioned in such a way that one of their oblique reflective facets comes into engagement against the corresponding locating element of the mounting plate;

(c) the reference member is positioned on the stack of superimposed transparent strips in such a way that its horizontal first portion is placed on the upper surface of the light guide, and vertical second portion is placed against the front or output faces of the transparent strips; and (d) the retaining member is secured to the reference member in such a way that the retaining member holds the transparent strips, superimposed on each other in engagement by compression against the first and second portions of the reference member.

In the method of the invention, using the mounting plate (constituting a jig), the transparent strips are indexed in the direction of the longitudinal axis of the light guide by superimposing them in a stack before placing them in engagement on the horizontal and vertical flat portions of the reference member, so that their reflective facets and their light output faces are positioned with respect to the horizontal and vertical reference planes defined by the reference member.

When they are then mounted on the reference member, the transparent strips are then in the correct predetermined positions in all three directions in space.

In some embodiments of the method according to the invention, in step (c), the reference member is positioned on the stack of superimposed transparent strips in such a way that its horizontal first portion is placed partly against the top surface of the shortest and topmost transparent strip and partly against the exposed portion of the top surface of the transparent strip positioned just below the latter.

In other versions of the method, in step (c), the terminal facet of the topmost and shortest transparent strip engages against the locating element carried by the first portion of the reference member, so as to ensure positioning of the topmost transparent strip on the longitudinal axis of the light guide.

Thus, in this form of the method of the invention, it is not necessary to provide a locating element on the mounting plate of the jig for indexing the short uppermost transparent strip of the light guide on the longitudinal axis of the light guide, because this indexation is provided by the indexing element that is provided on the reference member itself.

In the method of the invention, retention of the stack of superimposed transparent strips is obtained by compression, in both the horizontal and vertical directions, effected when the retaining member and the reference member are assembled together. The light guide is held against movement along, or with respect to, the longitudinal axis of the light guide by means of the friction forces that are exerted between the successive superimposed faces of the compressed transparent strips, these friction forces being enough to ensure that the strips are prevented from moving.

Further features and advantages of the invention will appear more clearly upon reading the following description of some preferred embodiments of the invention, which is given by way of non-limiting example only and with reference to the accompanying drawings.

BRIEF DESCRIPTION OF THE DRAWINGS

FIG. 1 is a diagrammatic perspective view showing one embodiment of a lighting module in accordance with the invention.

FIG. 2 is a front perspective view of a reference member for a lighting module according to the invention.

FIG. 3 is a rear perspective view of the reference member of FIG. 2.

FIG. 4 is a front perspective view of a retaining member for a lighting module according to the invention.

FIG. 5 is a perspective view, seen from above, of a base plate or jig, on which are positioned the retaining member and the superimposed transparent strips, in accordance with the method of making a lighting module according to the invention.

DESCRIPTION OF PREFERRED
EMBODIMENTS OF THE INVENTION

FIG. 1 shows a lighting module 1000 for a motor vehicle, which comprises a "real" light source, i.e. a source generating light when energized with power, together with means 1001 for concentrating the light radiation issued from the light source on one end of a light guide 1100.

The means for concentrating the light radiation emitted from the light source consists essentially of a reflector, or elliptical mirror, 1001. The light source itself (not visible in the drawings) consists of the filament of a motor vehicle lamp, which is mounted in the housing seen at the left-hand end of FIG. 1, and which is preferably disposed in the axis of the elliptical reflector 1001 at one of its foci. The light flux from the light source is reflected by the reflector 1001 in a set of rays which converge to the focal zone of the second focus of the elliptical reflector.

The light guide 1100, for guiding the light in the lighting module 1000, comprises a plurality of oblique reflective facets 1111, 1121, 1122 and 1131, in which connection see in particular FIG. 5. These facets cooperate with a plurality of elements 1111$a$, 1121$a$, 1122$a$ and 1131$a$, which in this example consist of Fresnel lenses, are homologous and have axes parallel to the general direction E of emission of the light from the module.

As can be seen more particularly in FIG. 5, the light guide 1100 comprises a plurality of transparent strips 1110, 1120 and 1130, which in this example are of different lengths, and which are juxtaposed in at least one direction, being superimposed in a stack in the present case. Each transparent strip extends along the longitudinal axis XX of the light guide 1100, and substantially transversely to the emission direction E.

In this embodiment, the longitudinal axis of the light guide is horizontal. It may of course be arranged that this longitudinal axis is instead slightly inclined in the vertical plane.

In the embodiment shown in FIG. 1, the light guide 1100 has three of these transparent strips 1110, 1120 and 1130, which are superimposed in the vertical direction and are transverse to the longitudinal axis of the light guide and to the emission direction E. In this example, each of these transparent strips is made of glass.

Each transparent strip 1110, 1120, 1130 includes, at its end furthest away from the light source, a terminal, oblique, reflective facet 1111, 1122, 1131 respectively. The intermediate strip 1120 also has a further reflective facet 1121, which is defined by a cut-out portion formed in the rear part of the strip.

The four oblique reflective facets 1111, 1121, 1222 and 1131 are inclined with respect to the emission direction E, their inclination being in the range between 35° and 55°, according to the positioning of the longitudinal axis of the light guide with respect to the emission direction E.

Each transparent strip includes, at its opposite end from the terminal facet of that strip, an input face for receiving light, extending transversely to the longitudinal axis of the light guide. All of these input faces of the transparent strips together constitute the input face of the light guide itself. Each transparent strip also has a light output face, which in this example is a front face extending along the longer of the two longitudinal sides of the transparent strip, substantially at right angles to the emission direction E and with the width of the output face vertical.

The lighting module 1000 also includes a reference member 1200 for mounting the light guide 1100. As can be seen more particularly in FIGS. 2 and 3, to which reference is also now made, the reference member 1200 comprises a horizontal, generally flat, first portion 1210, 1220, which extends along the longitudinal axis XX of the light guide 1100, and which defines a horizontal reference plane. The reference member 1200 also has a vertical, generally flat second portion 1230, which extends at right angles to the first portion 1210, 1220 and which defines a vertical reference plane.

The transparent strips 1110, 1120 and 1130, juxtaposed in the light guide, are mounted in engagement against the first and second flat portions 1210, 1220, 1230 of the reference member 1200, in a predetermined position with respect to the longitudinal axis XX of the light guide 1100, in such a way that their oblique reflective facets cooperate with the Fresnel lenses 1111$a$, 1121$a$, 1122$a$, 1131$a$ associated with them so that the latter will project images in the emission direction E that correspond to the facets at a predetermined position within the illuminating beam.

It should be stated here that, in a vehicle light such as a headlight, with a light guide having transparent strips, no arrangement is made for ensuring introduction of the light at the desired height on the input faces of the transparent strips. The lighting profile at the input face of the light guide is not uniform, but has a high concentration in a zone which is approximately circular and a few millimetres in diameter, which should be centred at the interface of the strips 1110 and 1120. Ordinarily, the dispersion of the light over the thickness of the strips, associated with manufacturing tolerances in the flat glass used in making the strips, does not guarantee to be given that this zone with a high lighting level will be correctly positioned with respect to that interface. Thus, a penalty on the quality of the eventual light beam obtained would be imposed.

However, in the module according to the present invention, and as will be described in greater detail later herein, the upper face of the intermediate transparent strip 1120 of the light beam is located against the inner (lowermost) face of the horizontal, flat, first portion 1210, 1220 of the reference member 1200, while the upper transparent strip 1110 lies on the intermediate strip 1120. Thus, the interface between these two strips is perfectly positioned in a predetermined way with respect to the reference member 1200, and the indexed mounting of the reflector on the reference member then enables the above mentioned disadvantage to be mitigated.

As can be seen in FIGS. 2 and 3, the reference member 1200 is a monoblock component. Its generally horizontal flat first portion 1210, 1220 is an upper portion of the member, comprising an upper part 1210 and a lower part 1220 which are horizontal and parallel to each other, and which are joined together through a step 1250.

The top surface of the light guide 1200 bears against the inner face of this horizontal, generally flat first portion of the reference member. More particularly, the upper face of the shortest transparent strip 1110 bears against the inner face (underside) of the upper part 1210 of the horizontal flat portion of the reference member, and the upper surface of the portion of the intermediate transparent strip 1120 which extends beyond the shortest transparent strip bears against the lower face of the lower part 1220 of the horizontal first portion of the reference member 1200. The upper part 1210 of the horizontal flat first portion of the reference member has an oblique edge 1211 which is inclined with respect to the longitudinal axis XX, and extends from the step 1250 to the end of the member 1200 nearest to the reflector.

In the embodiment shown in FIG. 2, this oblique edge 1211 carries a locating element 1212 which projects towards the light guide. More generally, the first portion 1210, 1220 of the reference member has a locating element such as 1212, which enables the transparent strip that is in direct engagement against the flat upper part 1210 of the reference member 1200 to be positioned with respect to the longitudinal axis XX. In this example the strip concerned is the shortest transparent strip 1110. In FIG. 1, the locating element is a corner of the lower part 1220.

The vertical flat second portion 1230 of the reference member 1200 is a front portion which is formed with a particular cut-out profile that is a function of the length and positioning of the oblique reflective facets of the transparent strips. The front output faces of the transparent strips of the light guide bear on the portion 1230.

The reference member 1200 includes a frame 1240 which is of generally circular form in this example. The elliptical reflector 1001, carrying the light source, is mounted on this frame. The length of the shortest, and topmost, strip 1110 of the light guide is such that the second focus of the elliptical reflector mounted in the circular frame 1240 is situated at the end of this topmost strip that is formed with the oblique reflective facet 1111, in order to obtain on this reflective facet a concentration of light which will give the emitted light beam its range.

As is shown in FIGS. 2 and 3, at the rear of the reference member 1200 and at the end of the latter furthest from the reflector, holes 1201, 1202, 1203 and 1204 are provided for fastening a retaining member 1300 on the reference member 1200. In this connection, the lighting module 1000 includes the retaining member 1300, which is fixed on the reference member 1200 in engagement against the rear and lower faces of the light guide 1100, so as to hold the transparent strips 1110, 1120 and 1130 in engagement, by compression, against the first and second flat portions 1210, 1220, 1230 of the reference member 1200.

With reference now also to FIG. 4, the retaining member 1300 comprises a base 1310 which extends along the longitudinal axis XX of the light guide, in a horizontal plane which is parallel to the horizontal reference plane defined by the horizontal flat portion 1210, 1220 of the reference member. A vertical riser 1320 extends along the rear longitudinal edge of the horizontal base 1310, and is arranged to engage against the rear face of the light guide. On the inner face of this vertical riser 1320, facing towards the rear face of the light guide, compressible, flexible elements 1330 are provided. When the retaining member 1300 is fixed to the reference member 1200, these compressible flexible elements 1300, positioned between the rear face of the light guide and the retaining member 1300, contribute to the maintenance by compression of the front or output faces of the transparent strips against the internal, or back, face of the flat vertical second portion 1230 of the reference member. The retaining member 1300 has holes 1301, 1302, 1303 on its vertical riser, together with holes 1304, 1305 on the front face of the base 1310, which are aligned with the holes 1201, 1202, 1203 and 1204 in the reference member for fastening of the retaining member 1300 to the reference member 1200 by means of screws.

The lighting module 1000 may also include an elastic pressure element, not shown, such as a leaf spring, between the light guide and the flat first portion 1210, 1220 of the reference member. This elastic pressure element may be placed between the inner face of the upper part 1210 of the flat first portion of the reference member, and the upper surface of the shortest transparent strip 1110. It assists in retaining the transparent strips by compression against the first portion of the reference member.

In addition, the lighting module 1000 has at its front end a mounting member 1400, FIG. 1. The mounting member 1400 comprises two horizontal plates 1410, 1420 which are disposed parallel and in facing relationship with each other. The plates 1410 and 1420 are joined together through vertical risers. Mounting brackets 1430 extend from these vertical risers of the mounting member 1400, and are fixed on the reference member 1200 at each of its ends. The internal faces that face towards the base plates 1410 and 1420 of the mounting member 1400 are formed with grooves which constitute slides for mounting the Fresnel lenses 1111a, 1121a, 1122a and 1131a therein. These grooves for mounting the Fresnel lenses have a particular orientation with respect to the emission direction E, and are so positioned with respect to the vertical flat second portion 1230 of the reference member 1200 that, when mounted in these grooves with the mounting member 1400 secured to the reference member 1200, the Fresnel lenses cooperate optically with the oblique reflective facets of the transparent strips mounted in engagement against the reference member, so as to project an image corresponding to these facets in the emission direction E.

For forming a cut-off beam, the lighting module 1000 may include masks 1440, disposed in the path of certain elementary beams of at least some of the reflective facets, between the front face of the transparent strips concerned and the associated dioptric elements. These masks are fixed with respect to the mounting member 1400, which is itself fixed on the reference member in a position which is predetermined with respect to the latter. These masks and the front member 1400 may be combined in a single component. Alternatively, the masks may be separate components carried on the said mounting member 1400, being fixed to the latter by suitable fastening means.

It should be noted that the reference member 1200, the retaining member 1300 and the mounting member 1400 are preferably made of aluminium castings. The Fresnel lenses 1111a, 1121a, 1122a and 1131a may be made of poly-N-methylmethacrylimide.

FIG. 5 shows the principle of mounting of the lighting module 1000 shown in FIG. 1, in accordance with the method of the present invention.

In this method, the retaining member 1300 is positioned on a mounting plate 2000 of a jig shown in FIG. 5. The mounting plate 2000 has a lateral riser carrying locating elements 2001, 2002 and 2003, for the indexed positioning of the transparent strips 1130, 1120 and 1110 on the longitudinal axis XX of the light guide. For this purpose, these locating elements are in predetermined positions on the longitudinal axis of the mounting plate 2000.

Once the retaining member 1300 has been positioned in this way, the transparent strips 1110, 1120 and 1130 of the light guide are stacked on the retaining member 1300 in decreasing lengths, with the transparent strips 1130, 1120, 1110 being positioned in such a way that the oblique reflective facets 1131, 1121 and 1111 engage against the respective locating elements 2001, 2002 or 2003 of the mounting plate 2000. As regards the intermediate transparent strip 1120, it is the first oblique reflective facet 1121, formed on its rear face, which is engaged against the corresponding locating element 2002 of the mounting plate 2000.

The reference member 1200, which is not shown in FIG. 5, is then positioned on the stack of superimposed transparent strips 1130, 1120 and 1110, in such a way that, firstly, its horizontal flat first portion 1210, 1220 overlies the top surface of the upper, and shortest, strip 1110 and the exposed top surface of the portion of the intermediate transparent strip 1120 that projects beyond the strip 1110. Secondly, the vertical flat second portion 1230 of the reference member 1200 comes against the front or outlet faces of the transparent strips.

The retaining member 1300 is then secured to the reference member by means of screws, so that the retaining member holds the transparent strips together in compression, and in engagement against the first and second flat portions of the reference member 1200. The mounting plate 2000 (the jig) can then be withdrawn.

In another version of this method, it can be envisaged that the mounting plate 2000 does not have any locating element for positioning the shortest transparent strip of the light guide. In that case, this shortest, or topmost, transparent strip is simply positioned on the intermediate strip. During placing of the reference member in position, the terminal facet of this short upper strip then comes into engagement against the positioning or locating element such as the element 1212 on the oblique terminal edge of the upper part of the horizontal flat first portion of the reference member. This provides correct indexing of the short topmost transparent strip on the longitudinal axis of the light guide. The locating element also enables any pivoting of the short strip to be avoided.

Thus, in this method, the indexed positioning of the transparent strips of the light guide on the longitudinal axis of the latter is obtained during its assembly by means of the locating elements in predetermined positions on the mounting plate of the jig. When the compressive retaining member is fixed to the reference member, the transparent strips of the light guide are held by compression against the two reference planes defined by the reference member 1300. No supplementary member is required for preventing any displacement of the transparent strips in the direction of the longitudinal axis XX of the light guide. The compressive force holding the transparent strips against the flat portions of the reference member are enough to generate friction forces between the transparent strips, which prevent the latter from moving in the longitudinal axis XX.

The system whereby the light guide is mounted within the lighting module 1000 enables the output faces of the transparent strips to be accurately positioned. It also ensures good positioning of the oblique reflective facets at the ends (and, where appropriate, on the rear face) of the transparent strips, with respect to two reference planes, so that the facets will cooperate optically with the Fresnel lenses in order that the images from the facets, projected by the lenses in the emission direction, are positioned in a predetermined way so as to form a normalized light beam. This position with respect to two reference planes enables errors due to manufacturing tolerances in the individual transparent strips to be avoided.

In addition, preferably, the fact that the Fresnel lenses and the masks discussed above are fixed with respect to a common mounting member, which is positioned in a predetermined way with respect to the reference member, enables good relative positioning to be obtained between the lenses and the masks, regardless of any dispersion and spreading which may occur during operation of the lighting module. The lenses and the masks are also well positioned with respect to the output faces of the transparent strips and the oblique reflective facets. In all cases, the mounting member at the front of the module enables the relative position of the lenses and masks to be kept, which enables good cut-off in the emitted beam to be obtained.

The present invention is in no way limited to the embodiments described and shown, and a person skilled in this technical field will be able to apply any modification within the invention spirit of the.

For example, the light guide may consist of more than three transparent strips. In that case, the mounting plate of the jig has a corresponding number of locating elements. In addition, the number of oblique reflective facets may be different.

What is claimed is:

1. A lighting module comprising:
a light source;
a plurality of dioptric elements defining a direction of light emission from the module, said dioptric elements being homologous parallel to said emission direction;
a light guide interposed optically between said source and said dioptric elements and defining a longitudinal axis of the light guide, the light guide having an input end and defining a plurality of reflective facets oblique to said longitudinal axis; and
means optically interposed between the source and the light guide for receiving light from the source and concentrating said light on the input end of the light guide,
wherein the light guide comprises a plurality of transparent strips juxtaposed in a stack and extending along said longitudinal axis, each strip having a first end at said input end of the light guide and a second end remote from said first end, at least one said facet, said facets being flat and said at least one facet of each strip comprising a terminal facet at said second end of the strip, the module further including a reference member mounting the light guide therein, the reference member comprising a horizontal, generally flat, first portion defining a horizontal reference plane, together with a vertical, generally flat, second portion extending along said longitudinal axis and defining a vertical reference plane, said stack of strips being mounted in abutment against the first and second portions of the reference member, in a predetermined position along the longitudinal axis, so that said facets cooperate optically with the dioptric elements, whereby images of the facets projected by the dioptric elements in the emission direction are positioned in a predetermined way.

2. The lighting module according to claim 1, wherein each said strip has an output face, being a front face of the strip parallel to said longitudinal axis, the light guide having an upper surface, said first portion of the reference member being an upper portion thereof, against which at least part of the top surface of the light guide bears, and the second portion of the reference member being a front portion thereof, against which the output faces of the strips bear.

3. The lighting module according to claim 1, further including a retaining member, the light guide further having a bottom surface and a rear surface, the retaining member being fixed on the reference member and in engagement against a rear and bottom surface of the light guide, so as to maintain the transparent strips by compression in engagement against the first and second portions of the reference member.

4. The lighting module according to claim 3, further including compressible flexible elements interposed operatively between the rear surface of the light guide and the retaining member.

5. The lighting module according to claim 1, further including an elastic pressure clement between the light guide and the first portion of the reference member.

6. The lighting module according to claim 1, wherein the strips are of different lengths and are stacked in decreasing order of their length with the shortest uppermost, the reference member having an end and including a frame at said end, and an elliptical reflector mounted in the frame and carrying the light source, the reflector defining a first focus and a second focus such that the second focus is situated at the end of the uppermost transparent strip of the light guide, which is in direct engagement against the first portion of the reference member.

7. The lighting module according to claim 1, wherein the said first portion of the reference member comprises a flat upper part, a flat lower part, the upper and lower parts being in horizontal planes parallel to each other, and a step joining the upper and lower parts together, the upper part having an oblique terminal edge, the said first portion of the reference member further including a locating element for positioning, with respect to said longitudinal axis, said transparent strip directly in engagement against the upper part.

8. The lighting module according to claim 1 for producing a cut-off beam, further including masks in a path of some elementary beams from at least some of the facets, between a front face of appropriate said transparent strips and the associated dioptric elements, the module further including a mounting member at the front of the module, the mounting member being fixed on the reference member in a predetermined position with respect to the reference member, the mounting member, and the masks being fixed to the mounting member.

9. The lighting module according to claim 8, wherein the masks and mounting member are combined in a single component.

10. The lighting module according to claim 8, wherein the masks are separate members fixed on the mounting member.

11. The lighting module according to claim 1, wherein the transparent strips are made of glass.

12. The lighting module according to claim 1, wherein the reference member is an aluminum casting.

13. The lighting module according to claim 3, wherein the retaining member is an aluminum casting.

14. The lighting module according to claim 8, wherein the mounting member is an aluminum casting.

15. The lighting module according to claim 1, wherein the dioptric elements are Fresnel lenses made of poly-N-methylmethacrylimide.

16. A headlight including a lighting module according to claim 1.

17. The headlight according to claim 16 having a long range beam reflector, the lighting module being fixed to the long range beam reflector and providing a short range function.

18. A method of making a lighting module having a retaining member for engagement of transparent strips against a reference member, the transparent strips having oblique facets, a horizontal first portion, a vertical second portion and output faces, the method comprising the steps of:
  (a) positioning the retaining member on a jig comprising an elongate mounting plate and locating elements carried in predetermined positions along said mounting plate, and positioning at least some of the transparent strips to define a longitudinal axis of the light guide;
  (b) placing the transparent strips on the retaining member, one on top of another in decreasing lengths, with at least some of the strips being positioned in such a way that one of the oblique facets comes into engagement against the corresponding said locating element of the mounting plate;
  (c) positioning the reference member on the stack of superimposed transparent strips in such a way that its horizontal first portion is placed on the top surface of the light guide, and its vertical second portion against the output faces of the transparent strips; and
  (d) securing the retaining member to the reference member in such a way that the retaining member holds the transparent strips, in engagement by compression against the reference member.

19. The method according to claim 18, wherein the reference member is positioned on the transparent strips in such a way that its horizontal first portion is placed partly against a top surface of the transparent strip which is shortest and topmost and partly against exposed portion of the top surface of the transparent strip positioned just below the upmost strip.

20. The method according to claim 19, wherein a terminal facet of the topmost and shortest transparent strip engages against the locating element carried by the first portion of the reference member.

21. A lighting module, comprising:
  a light source;
  a plurality of dioptric elements defining a direction of light emission from the module;
  a light guide, having a bottom surface and a rear surface, the light guide interposed between the light source and the dioptric elements and defining a longitudinal axis of the light guide, wherein the light guide has an input end and defines a plurality of reflective facets oblique to the longitudinal axis, and comprises a plurality of transparent strips extending along the longitudinal axis, wherein the transparent strips are juxtaposed in a stack and extending along said longitudinal axis; and
  a retaining member which is fixed on reference member and in engagement against the rear and bottom surfaces of the light guide, whereby compression maintains engagement of the transparent strips against the first and second portions of the reference member.

22. A light guide, comprising:
  a light source;
  a plurality of dioptric elements defining a direction of light emission from the module;
  a light guide, having a bottom surface and a rear surface, the light guide interposed between the light source and the dioptric elements and defining a longitudinal axis of the light guide, wherein the light guide has an input end and defines a plurality of reflective facets oblique to the longitudinal axis, and comprises a plurality of transparent strips extending along the longitudinal axis, wherein the transparent strips each have a first end at said input end of the light guide and a second end remote from said first end, at least one reflective facet oblique to said longitudinal axis, said at least one facet being flat and containing a terminal facet at said second end of said strip, wherein the transparent strips are juxtaposed in a stack and extending along said longitudinal axis and
  a reference member mounting the light guide therein, the reference member comprising a horizontal first portion and a vertical second portion extending along said longitudinal axis.

23. The lighting module of claim 22, wherein said stack of strips are mounted in abutment against the first and second portions of the reference member in a predetermined position along the longitudinal axis, whereby the fact cooperate optically with the dioptric elements.

24. The lighting module of claim 23, wherein images of the facets projected by the dioptric elements in the emission direction are positioned in a predetermined manner.

25. The lighting module according to claim 22 for producing a cut-off beam, further comprising at least one mask between a front face of the corresponding transparent strips and the associated dioptric elements.

26. A head light including a lighting module, the lighting module comprising:
   a light source;
   a plurality of dioptric elements defining a direction of light emission from the module;
   a light guide interposed between the light source and the dioptric elements and defining a longitudinal axis of the light guide, the light guide having an input end and defining a plurality of reflective facets oblique to the longitudinal axis, wherein the light guide comprises a plurality of transparent strips extending along the longitudinal axis and
   a reference member mounting the light guide therein, the reference member comprising a horizontal first portion and a vertical second portion extending along said longitudinal axis.

27. A motor vehicle including a lighting module, the lighting module comprising:
   a light source;
   a plurality of dioptric elements defining a direction of light emission from the module;
   a light guide interposed between the light source and the dioptric elements and defining a longitudinal axis of the light guide, the light guide having an input end and defining a plurality of reflective facets oblique to the longitudinal axis, wherein the light guide comprises a plurality of transparent strips extending along the longitudinal axis; and
   a reference member mounting the light guide therein.

28. A method for making a lighting module having a retaining member for engagement of transparent strips against a reference member, the transparent strips having oblique facets, a horizontal first portion, a vertical second portion and output facets, the method comprising the steps of:
   positioning the retaining member on a jig;
   positioning at least of the transparent strips to define a longitudinal axis of the light guide;
   placing the transparent strips on the retaining member, one on top of another in decreasing lengths;
   positioning the reference member on the stack of superimposed transparent strips; and
   securing the retaining member to the reference member.

29. The method according to claim 28, wherein the reference member is positioned on the transparent strips in such a way that its horizontal first portion is placed partly against a top surface of the transparent strip which is shortest and topmost and partly against an exposed portion of top surface of the transparent strip positioned just below the topmost strip.

30. The method according to claim 29, wherein a terminal facet of the topmost and shortest transparent strip engages against a locating element carried by the first portion of the reference member.

31. A system for making a lighting module having a retaining member for engagement of transparent strips against a reference member, the transparent strips having oblique facets, a horizontal first portion, a vertical second portion and output facets, comprising:
   a means for positioning the retaining member on a jig and positioning at least some of the transparent strips to define a longitudinal axis of the light guide;
   a means for placing the transparent strips on the retaining member wherein at least one of the strips is being positioned in such a way that one of the oblique facets comes into engagement against corresponding locating element of the mounting plates;
   a mean for positioning the reference member on the stack of superimposed transparent strips; and
   a means for securing the retaining member to the reference member.

32. A lighting module, comprising:
   a light source;
   a plurality of dioptric elements defining a direction of light emission from the module;
   a light guide interposed between the light source and the dioptric elements and defining a longitudinal axis of the light guide; and
   a reference member mounting the light guide therein, the reference member comprising a horizontal first portion and a vertical second portion extending along said longitudinal axis.

33. The light guide according to claim 32, wherein the light guide has an input end and defines a plurality of reflective facets oblique to the longitudinal axis, and comprises a plurality of transparent strips extending along the longitudinal axis.

34. The light guide according to claim 33, wherein the transparent strips are juxtaposed in a stack and extending along said longitudinal axis.

35. The light guide according to claim 34, wherein the transparent strips each have a first end at said input end of the light guide and a second end remote from said first end, at least one reflective facet oblique to said longitudinal axis, said at least one facet being flat and containing a terminal facet at said second end of said strip.

36. The lighting module of claim 35, wherein said stack of strips are mounted in abutment against the first and second portions of the reference member in a predetermined position along the longitudinal axis, whereby the facet cooperate optically with the dioptric elements.

37. The lighting module of claim 36, wherein images of the facets projected by the dioptric elements in the emission direction are positioned in a predetermined manner.

38. The lighting module according to claim 35, further comprising a retaining member, the light guide further having a bottom surface and a rear surface, the retaining member fixed on the reference member and in engagement against the rear and bottom surfaces of the light guide, whereby compression maintains engagement of the transparent strips against the first and second portions of the reference member.

* * * * *